(12) United States Patent
Ritchie (10) Patent No.: US 12,009,947 B2
(45) Date of Patent: *Jun. 11, 2024

(54) CONNECTING TO MULTIPLE CLOUD INSTANCES IN A TELECOMMUNICATIONS NETWORK

(71) Applicant: Level 3 Communications, LLC, Broomfield, CO (US)

(72) Inventor: Austin D. Ritchie, Parker, CO (US)

(73) Assignee: Level 3 Communication, LLC, Broomfield, CO (US)

( * ) Notice: Subject to any disclaimer, the term of this patent is extended or adjusted under 35 U.S.C. 154(b) by 120 days.

This patent is subject to a terminal disclaimer.

(21) Appl. No.: 17/730,812

(22) Filed: Apr. 27, 2022

(65) Prior Publication Data

US 2022/0255773 A1 Aug. 11, 2022

Related U.S. Application Data

(63) Continuation of application No. 16/985,725, filed on Aug. 5, 2020, now Pat. No. 11,323,292, which is a continuation of application No. 16/031,985, filed on Jul. 10, 2018, now Pat. No. 10,742,447.

(Continued)

(51) Int. Cl.
*H04L 12/46* (2006.01)
*H04L 41/0803* (2022.01)
(Continued)

(52) U.S. Cl.
CPC ...... *H04L 12/4675* (2013.01); *H04L 12/4641* (2013.01); *H04L 12/4666* (2013.01);
(Continued)

(58) Field of Classification Search
CPC ............ H04L 12/4675; H04L 12/4641; H04L 12/4666; H04L 41/0803; H04L 41/0893;
(Continued)

(56) References Cited

U.S. PATENT DOCUMENTS

9,130,859 B1 * 9/2015 Knappe ............... H04L 12/1886
10,355,989 B1 7/2019 Panchal
(Continued)

*Primary Examiner* — Redentor Pasia (57) ABSTRACT

Aspects of the disclosure involve systems and methods for utilizing Virtual Local Area Network separation in a connection, which may be a single connection, between a customer to a telecommunications network and a cloud environment to allow the customer to access multiple instances within the cloud through the connection. A customer may purchase multiple cloud resource instances from a public cloud environment and, utilizing the telecommunications network, connect to the multiple instances through a communication port or connection to the cloud environment. To utilize the single connection or port, communication packets intended for the cloud environment may be tagged with a VLAN tag that indicates to which cloud instance the packet is intended. The telecommunications network may route the packet to the intended cloud environment and configure one or more aspects of the cloud environment to analyze the attached VLAN tag to transmit the packet to the intended instance.

14 Claims, 4 Drawing Sheets

Related U.S. Application Data (60) Provisional application No. 62/530,485, filed on Jul. 10, 2017.

(51) Int. Cl.
  *H04L 41/0893* (2022.01)
  *H04L 41/0895* (2022.01)
  *H04L 41/50* (2022.01)
  *H04L 45/02* (2022.01)
  *H04L 45/50* (2022.01)
  *H04L 49/354* (2022.01)
  *H04L 67/10* (2022.01)

(52) U.S. Cl.
  CPC ...... *H04L 41/0803* (2013.01); *H04L 41/0893* (2013.01); *H04L 41/0895* (2022.05); *H04L 41/5096* (2013.01); *H04L 45/04* (2013.01); *H04L 45/507* (2013.01); *H04L 49/354* (2013.01); *H04L 67/10* (2013.01)

(58) Field of Classification Search
  CPC . H04L 41/0895; H04L 41/5096; H04L 45/04; H04L 45/507; H04L 49/354; H04L 67/10
  See application file for complete search history.

(56) References Cited

U.S. PATENT DOCUMENTS

| | | |
|---|---|---|
| 10,742,447 B2 | 8/2020 | Ritchie |
| 2003/0152075 A1 | 8/2003 | Hawthorne, III |
| 2007/0286108 A1* | 12/2007 | Meier .................. H04L 12/185 370/312 |
| 2009/0154470 A1 | 6/2009 | Kuc |
| 2011/0222439 A1 | 9/2011 | Long |
| 2011/0299537 A1* | 12/2011 | Saraiya ................ H04L 69/16 370/392 |
| 2012/0033668 A1* | 2/2012 | Humphries ........... H04L 45/245 370/390 |
| 2012/0281708 A1 | 11/2012 | Chauhan |
| 2013/0028133 A1* | 1/2013 | Narasimhan ............ H04L 69/22 370/254 |
| 2013/0051376 A1* | 2/2013 | Hatashita ................ H04W 4/00 370/338 |
| 2013/0201978 A1* | 8/2013 | Iyer ........................ H04L 67/14 370/338 |
| 2013/0336331 A1 | 12/2013 | Woerndle |
| 2014/0064150 A1* | 3/2014 | Finn ....................... H04L 45/48 370/256 |
| 2014/0115182 A1 | 4/2014 | Sabaa |
| 2015/0109924 A1* | 4/2015 | Agarwal ............ H04L 12/1886 370/235 |
| 2015/0326467 A1* | 11/2015 | Fullbright ............... H04L 45/02 709/242 |
| 2016/0337175 A1* | 11/2016 | Rao ..................... H04L 67/51 |
| 2018/0063000 A1 | 3/2018 | Wu |
| 2018/0219802 A1* | 8/2018 | Uttaro ................ H04L 12/4641 |
| 2018/0302243 A1 | 10/2018 | Li |
| 2019/0014038 A1 | 1/2019 | Ritchie |
| 2019/0116133 A1* | 4/2019 | Chen .................... H04L 47/125 |
| 2020/0366528 A1 | 11/2020 | Ritchie |

\* cited by examiner

CONNECTING TO MULTIPLE CLOUD INSTANCES IN A TELECOMMUNICATIONS NETWORK

TECHNICAL FIELD

Embodiments of the present invention generally relate to systems and methods for implementing a telecommunications network, and more specifically for utilizing Virtual Local Area Network (VLAN) separation in a connection between a customer to the network and a public cloud environment to allow the customer to access multiple instances within the cloud through the connection.

BACKGROUND

Telecommunication networks provide for the transmission of information across some distance through terrestrial, wireless or satellite communication networks. Such communications may involve voice, data or multimedia information, among others. In addition, telecommunication networks often offer features and/or services to the customers of the network that provide flexible and varied ways in which the communications are transmitted over the network. For example, some telecommunication networks provide Internet access to its customers, long distance communication capabilities, high definition audio and/or video communication capabilities, and the like. In other examples, the telecommunication network may be utilized to provide connectivity to one or more cloud-based resources offered by a third party. In other words, customers may purchase resources from a public cloud service to virtualize one or more of their processes and connect to such resources through a telecommunications network.

Often times, customers purchase multiple resources from the public cloud service. For example, a customer may purchase a group of resources (such as data storage resources, processing resources, security resources, and the like) for each step in a process, such as a group of resources for development, a group for testing, and a group for manufacturing. Further, the cloud environment may maintain a separation between the groups of resources within the cloud environment so that use of one group of resources does not negatively affect other groups used by the customer. Each group of resources may be referred to as a "segment" or "instance" of cloud resources within the cloud environment. Typically, however, the customer is connected to each cloud instance through an individual private connection between a customer port and the cloud instance to maintain the separation of the instances. Thus, if a customer purchases three cloud instances, three connections to the instances are made through the connectivity network. The multiple connections typically take a longer time to establish between the customer and the cloud environment, reducing the flexibility and efficiency of the connectivity network in providing the customer the cloud resources.

Summary

Aspects of the present disclosure involve systems and methods for connecting to multiple cloud instances from a singleport of a network. A first plurality of communication packets from a first device is received from a single port, where the first plurality of communication packets are associated with a first Virtual Local Area Network identifier. In addition, a second plurality of communication packets from the first device is received from the single port as well, where the second plurality of communication packets is associated with a second Virtual Local Area Network identifier. In embodiments, the first Virtual Local Area Network identifier is associated with a first cloud computing instance in a cloud computing environment and the second Virtual Local Area Network identifier is associated with a second cloud computing instance in the cloud computing environment. At least one device, such as an edge device, router, or the like, of the cloud environment is configured, such as through an API, to route the packets, based on the distinct VLAN identifiers. For example, the first plurality of communication packets associated with the first Virtual Local Area Network identifier are then routed to a first edge device of the cloud computing environment for connection to the first cloud computing instance, and the second plurality of communication packets associated with the second Virtual Local Area Network identifier is routed to a first edge device of the cloud computing environment for connection to the second cloud computing instance. Accordingly, distinct connections with the first device, which may be a customer device, are not required to establish distinct connections with instances in the cloud. Similarly, distinct VLANs through a network, such as a backbone network, between the customer and the cloud are also not required, among other advantages.

DETAILED DESCRIPTION

Aspects of the present disclosure involve systems, methods, computer program products, and the like, for utilizing Virtual Local Area Network (VLAN) separation in a connection, which may be a single connection, between a device, which may be a customer device or a first network, and a cloud environment, which may be a public or private cloud, to allow the customer device to access multiple instances within the cloud through the connection. Through the systems and methods described, the customer operating the customer device may purchase multiple cloud resource instances from a public cloud environment and, utilizing the telecommunications network, connect to the multiple instances through a communication port or single connection of the customer the device to the cloud environment by way of the intervening network. This may replace the conventional configuration of providing individual connections or ports between the customer device/first network and each instance of the cloud resources. To utilize the single connection or port, communication packets intended for the cloud environment may be tagged with a VLAN tag that indicates to which cloud instance the packet is intended. The telecommunications network may route the packet to the intended cloud environment. In advance, the cloud environment is configured to recognize the VLAN tags in any inbound traffic, particularly traffic associated with the customer port, to analyze the attached VLAN tag to transmit the packet to the intended instance. Thus, rather than providing multiple tunnels between the customer, whether a customer device or the first network, and the cloud environment, one for each cloud instance, a single tunnel may be utilized to provide all traffic to the cloud environment for all instances used by the first network. This configuration may also allow for a faster connection from the customer to new cloud instances through the telecommunications network.

Figure 1:
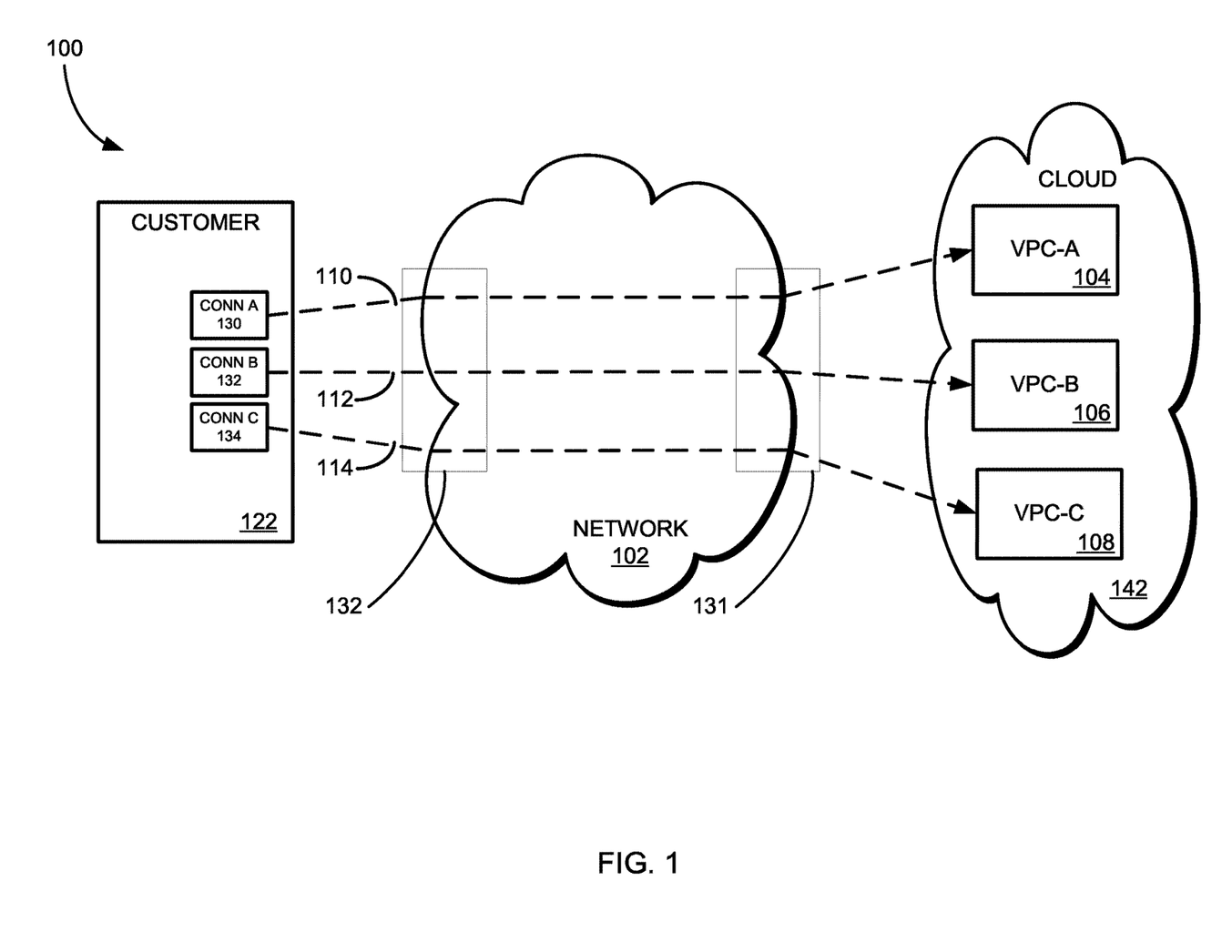
FIG. 1 is a schematic diagram illustrating a first network environment for providing connectivity between a customer to a telecommunications network and multiple instances of a cloud environment.

FIG. 1 is a schematic diagram illustrating a first network environment 100 illustrating the limitations of multiple connections to cloud environment 142. The first network environment 100, for example, provides connectivity between a customer 122 and multiple instances of a cloud environment 142 by way of a telecommunications network 102. The telecommunications network 102 provides a connection between the customer devices or network 122 and the cloud 142, which may be a public virtual cloud, such that the customer may request resources from the public cloud and access those resources through the network. In particular, customer network may purchase resources from the virtual cloud environment 142 to execute processes on the resources. To utilize those purchased resources, the telecommunications network 102 may provide a connection between the customer's devices 110 (referred to sometimes herein as simply the "customer") and the virtual cloud environment 142. More particularly, the customer's devices may connect to and provide/receive data and packets through a provider edge 132, the network 102, and a provider edge 131. As explained in more detail below, the connection facilitated by the network 102 may be a connection over a public portion of the network 102 or a connection over a private or dedicated portion of the network. Regardless of the type or construct of the connection, the network 102 thus provides a communication path between the customer 106 and the virtual cloud environment 142 to facilitate the use of cloud resources by the customer.

The network 102 may include a series of interconnected networking devices, such as routers and switches, that receive a communication, analyze the communication to determine a destination, and route the communication to a connected networking device to get the communication closer to a destination or egress point (such as provider edge 131). To determine which routes through the network to utilize to route a received communication or packet, components of the network may receive route information through one or more route announcing sessions between the devices. These route announcing sessions provide Layer 3 routing information between the components of the network and between different networks so that components of the telecommunications network 102 and other networks may determine how to route received communication packets.

In a conventional setting, the customer 122 is connected to each cloud instance through multiple individual private connections 130, 132, 134 between a customer port and each cloud instance to maintain the separation of the instances.

As discussed above, the customer 122 may purchase or otherwise utilize multiple cloud instances 104-108 for the execution of the customer processes. The multiple instances 104-108 may be utilized for a variety of reasons, such as, but not limited to, security concerns, redundancy, performance metrics, and the like. The separation of the cloud instances 104-108 may be virtual within the virtual cloud environment or may be physically separate on different physical resource devices. Regardless of the mechanism or technique to separate the cloud instances 104-108 in the cloud environment 142, the customer 122 may be connected to each instance through the network 102. In one particular embodiment, the network 102 provides a separate connection between the customer 122 and each instance 104-108 in the cloud environment 142. For example, connection A 130 provides connection to cloud instance 104 (e.g., storage resources), while connection B 132 provides connection to cloud instance B 106 (e.g., processing resources) and connection C 134 provides connection to cloud instance C 108 (e.g., security resources). As should be appreciated, the multiple connections 130, 132, 134 between the customer 122 and the instances 104-108 may include additional costs to set up for the network 102 and may be inefficient to provide the connection to the cloud services to the customer.

Although illustrated as separate connections 110-114 in the network 100 of FIG. 1, it should be appreciated that various configurations may be utilized in connecting the customer 122 to the cloud environment 142. For example, the customer 122 may connect to the network 102 through one or more communication ports, sometimes referred to as a User Network Interface (UNI). Through the UNI, the network 102 receives the communication packets intended for the cloud environment 142. In a similar manner, the network 102 may communicate with the cloud environment 142 through one or more communication ports. Further, an exchange of routing information, such as Border Gateway Protocol (BGP) information, may occur to allow network 102 to transmit and receive packets from the customer 122 and the cloud environment 142 at a Layer 3 communication level. Similarly, the network 102 may announce or exchange routing information (such as IGP) within the network to route communications between provider edges of the network. In general, BGP information (or BGP session, BGP feed or BGP data) is a table of Internet Protocol (IP) prefixes which designate network connectivity between autonomous systems (AS) or separate networks. BGP information for a network route may include path (including next-hop information), network policies, and/or rule-sets for transmission along the path, among other information. The BGP feed may also include Interior Gateway Protocol (IGP) information for network routes within an Autonomous System (AS) or network and/or other network information that pertains to the transmission of content from the network. However, BGP information mainly describes routes used by the network 102 to connect to external networks or customers (such as border network 122 and virtual cloud environment 142) while IGP information describes routes through the network to connect one provider edge (such as provider edge 132) to another provider edge (such as provider edge 131) through a telecommunications network 102. In addition to the Layer 3 connection, the network 102 may establish a private Layer 2 connection between the customer 122 and the cloud environment 142. This Layer 2 connection 110-114, sometimes referred to as a Peer-To-Peer (P2P) connection, allows for a secure communication of packets between the customer 122 and each instance 104-108 of the cloud environment 142. Thus, the Layer 2 connection provides a private communication tunnel between the customer 122 and a cloud instance 104-108 through the network 102.

Providing individual P2P connections between the customer 122 and the cloud instances 104-108 may provide some benefits to the customer such as secure communication paths and lower bandwidth requirement per tunnel. However, setting up individual communication tunnels 110-114 may take significant time and coordination between the customer 122 and the network 102 for each new instance 104-108 created in the cloud environment 142 upon a request from the customer. Provided with the ability to dynamically request additional cloud resources 104-108 in the cloud environment 142 and establish Layer 2 communications between the customer 122 and the cloud 142 through the network 102 quickly may improve the overall usage and performance of the network in providing cloud access to the customer.

Figure 2:
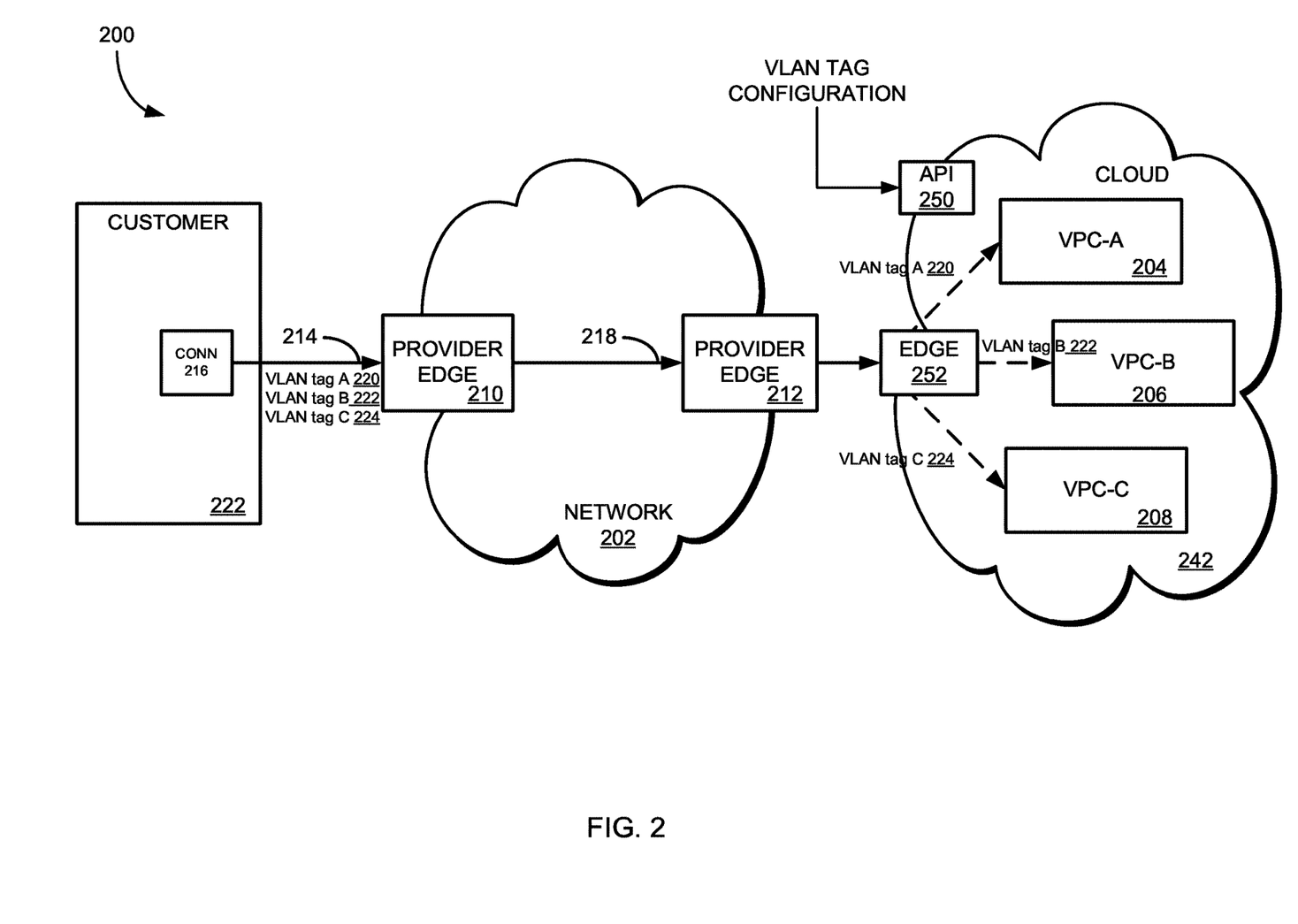
FIG. 2 is a schematic diagram illustrating a second network environment for providing connectivity between a customer to a telecommunications network and multiple instances of a cloud environment.

FIG. 2 is a schematic diagram illustrating a second network environment 200 for providing connectivity between a customer 222 to a telecommunications network 202 and multiple instances 204-208 of a cloud environment 242, which provides the advantage of a single connection 216 instead of multiple connections. For simplicity, FIG. 2 shows a single connection 216 between a single customer (customer 222) and multiple cloud instances 204-208 of cloud environment 242. However, in some embodiments, the single connection 216 can be multi-tenant, which can allow for multiple VLANs within each of multiple customers on the same physical interconnection (e.g., single connection 216 can handle more customers than just customer 222). For example, while the connection to cloud environment 242 can be between a UNI point (or communication port) on a device (router, switch) on customer 222 to a port of provider edge 210, the connection can also be between a single connection's 216 multi-port (connecting multiple customers) device (e.g., router, switch) on customer 222 that's a Link Aggregation Group (LAG) connection to provider edge 210. LAG connections allow a switch/router (e.g., multi-port device on customer 222) to treat multiple physical links between two end-points as a single logical link. Thus, network 202 can treat a LAG connection on provider edge 210 to customer 222 device as if it were a single physical port (e.g., multiple customers are treated as being on the same, common port on customer 222 device). Regardless of the number of customers connected to single connection 216, each customer follows the same environment and methodology for customer 222 described below.

Similar to the network configuration 100 of FIG. 1, the network 200 of FIG. 2 includes a customer 222 connected to multiple instances 204-208 of a virtual cloud environment 242 through the network 202. However, in the network embodiment 200 of FIG. 2, the packets intended for the multiple cloud instances 204-208 may be transmitted to the cloud environment 242 over a single connection 216 such that communication between the customer 222 and additional instances may occur without the need to create additional communication tunnels through the network 202. Rather, through the use of VLAN tags 220, 222, 224 included in the packet stream from the customer 222 to the network associated with the multiple instances 204-208 of the cloud environment 242, a single connection 216 may be established between the customer and the cloud to facilitate communication between the environments.

Packets may be routed to specific cloud instances based on the VLAN tag included within the packets. In the example of FIG. 2, packets with VLAN tag A 220 are routed to cloud instance A 204 (e.g., storage resources), while packets with VLAN tag B 222 are routed to cloud instance B 206 (e.g., processing resources) and packets with VLAN tag C 224 are routed to cloud instance C 208 (e.g., security resources). In this way, while a single connection 216 is used to connect to cloud environment 242, communication can be differentiated between different cloud instances. This makes second network environment 200 more flexible, efficient, and scalable than first network environment 100, which requires separate connections for each type of resource. The particulars of utilizing VLAN tags within the packet stream from the customer 222 to communicate with the multiple instances 204-208 of the cloud environment 242 is discussed in more detail below with reference to the method 300 of FIG. 3.

For simplicity, FIG. 2 illustrated the second network environment 200 providing connectivity between a customer(s) 222 to multiple instances 204-208 of a cloud environment 242 through telecommunications network 202. However, it is also contemplated that in some embodiments the telecommunications network 202 can interconnect two cloud environments instead of interconnecting a customer to a cloud environment.

Figure 3:
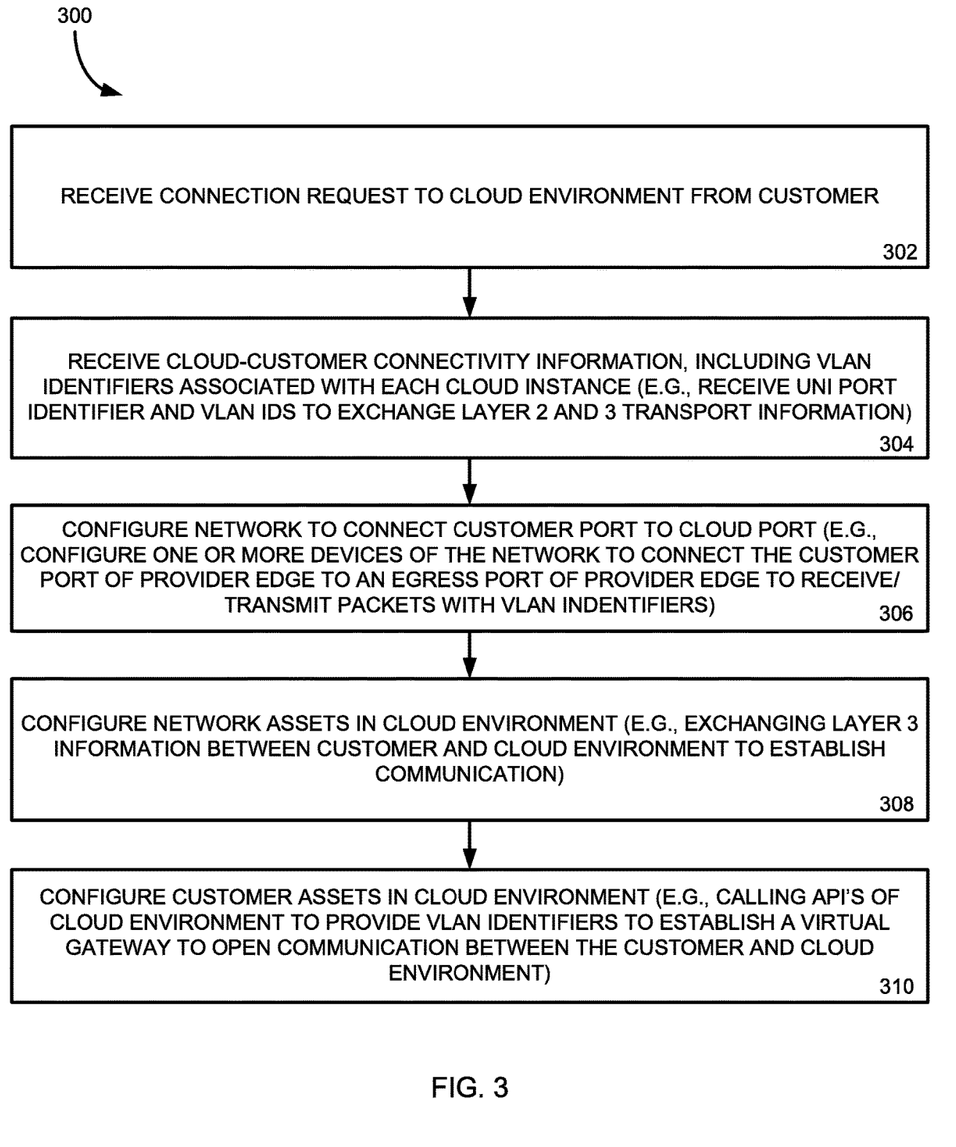
FIG. 3 is flowchart illustrating a method for utilizing Virtual Local Area Network (VLAN) separation in a connection between a customer to a network and a public cloud environment.

FIG. 3 is a flowchart illustrating a method 300 for utilizing VLAN separation through VLAN tags in a communication connection between a customer to a network and a public cloud environment. The operations of the method 300 may generally be executed by the network 202 illustrated in FIG. 2 to facilitate access to one or more cloud instances 204-208 of the cloud environment 242 by the customer 222 or customer devices. In particular, one or more components of the network 202 or an operator of the network may perform one or more of the operations of the method 300. In other embodiments, other networking or computing components may perform operations of the method 300, such as components of the customer 222. Further, the operations are discussed herein with reference to the network 200 configuration illustrated in FIG. 2. Through the method 300, a single connection between the customer 222 and the cloud environment 242 may be utilized to communicate with multiple instances 204-206 of the cloud through the telecommunications network 202.

Beginning in operation 302, the network 202 may receive a request from the customer 222 (such as a customer device in a customer location) to connect to an instance in the cloud environment 242. The request may be to connect to multiple instances 204-208 or a newly established instance in the cloud environment 242. For example, the customer 222 (or an administrator of the customer network) may purchase or otherwise request access to one or more resources 204-208 of the cloud environment 242. As mentioned above, such resources 204-208 may be data storage, compute resources, security resources, or any other virtual resource available from a virtual cloud environment. Once the resources 204-208 are purchased or obtained, the customer 222 (or administrator) may contact the network 202 (such as an administrator of the network) to request a communication connection to the cloud environment 242 to access the purchased cloud resources. The network 202 may, in turn, begin a process to provide communication between the customer 222 and the instances 204-208 in the cloud environment.

In operation 304, the customer provides connectivity information between the customer 222 and the cloud environment 242. In one embodiment, the customer 222 connects to provider edge 210 of network 202 over connection 214 to receive communications from the customer and provide communications intended for the customer. Thus, network 202 may provide at least one communication port (or UNI) of provider edge 210 through which communication with the customer 222 may occur. To establish the connection 214, customer 222 and network 202 may exchange Layer 3 routing information (such as through a BGP session) and Layer 2 transport information. In addition to providing for transmission of communication packets between the customer 222 and the network 202, connection 214 may also provide for transmission of the customer-cloud connectivity information. More particularly, customer 222 may provide an identifier of the instances 204-208 of the cloud environment 242 associated with the customer 222. Further, the customer 222 may provide a particular VLAN tag or other VLAN identifier that the customer associates with each instance 204-208. For example, VLAN-A tag may be associated with instance A 204, VLAN-B tag may be associated with instance B 206, and so on. The VLAN identifiers may be any identifier utilized by the customer 222 to associate with a cloud instance 204-208 utilized by the customer.

In another example, the customer 222 provides authentication information provided to the customer by the cloud environment 242 upon request for use of the cloud instances 204-208. In other words, the customer 222 may receive an account identifier from the cloud environment 242 that identifies the customer to the cloud. This information may then be provided to the network 202 such that the network may configure one or more aspects of the cloud environment 242 on behalf of the customer, as explained in more detail below.

With the customer-cloud connectivity information received, the network 202 may then configure one or more devices of the network to connect the customer port of provider edge 210 to an egress port of provider edge 212 to the cloud environment 242 in operation 306. In one particular embodiment, the network 202 may establish, through shared IGP information, a communication route or path 218 through the network between provider edge 210 connected to the customer 222 and provider edge 212 connected to the cloud environment 242. The created communication path through the network 202 may include configuring one or more of the network components to receive and/or transmit packets that include the VLAN tags of the packet stream from the customer 222. In one embodiment, the egress port to the cloud environment 242 may similarly be a UNI communication port.

In operation 308, the network 202 configures one or more assets of the cloud environment 242 associated with the network. For example, the network 202 may purchase or otherwise establish a connection 216 between the network and the cloud environment 242. In some instances, this includes requesting a communication port with the cloud environment 242 through which the network 202 may provide communication packets or frames. As such, the network 202 may have an identifier with the cloud environment 242 that the cloud may use to identify the network 202. In addition, Layer 3 information (such as BGP information) may be exchanged between the network 202 and the cloud environment 242 to establish a communication path between the networks. With the account information and BGP information, the cloud environment 242 may provide an open port with the provider edge 212 of the network 202 to receive communication packets intended for the cloud.

Once a communication port is provided and a communication link 216 established, the network may configure the cloud port to accept the VLAN tagged packets from the customer 222. In particular, the network 202 may call one or more Application Programming Interfaces (APIs) 250 to communicate with and configure aspects of the cloud environment. Through the APIs 250, the network 202 may provide the VLAN tags received from the customer 222 to the cloud environment 242 that are associated with the cloud instances 204-208 utilized by the customer. With the connection 216 established and the VLAN information, the cloud environment 242 may create a virtual interface associated with the communication port of the connection 216 to manage the receipt and transmission of packets on the path. This virtual interface may be provided with the VLAN tag identifiers for use by the cloud environment 242 as explained below.

Further, in operation 310, the network 202 may call one or more APIs 250 of the cloud environment 242 to associate the VLAN information of the customer 222 with the instances 204-208 within the virtual interface of the cloud. For example, the network 202 may instruct the cloud environment 242 to create a virtual gateway between the communication port at the cloud and a particular instance 204 utilized by the customer 222. The virtual gateway may then be associated with a particular VLAN tag or identifier that the customer 222 uses to identify packets intended for the particular instance 204 of the cloud environment 242. Similar virtual gateways may also be established for the other instances 206, 208 of the cloud environment 242 with their own unique VLAN identifiers. In one embodiment, the network 222 may also provide one or more authentication tokens provided to the customer 222 from the cloud environment 242 when the customer requested access to the cloud instances 204-208. The authentication token thus delegates the network 202 to configure the cloud environment 242 on behalf of the customer 222.

Through the method 300 of FIG. 3, the network 202 may establish a private Layer 2 communication path between the customer 222 and the cloud instances 204-208. In particular, the network 202 may establish a VPN for communication with each instance 204-208 through the network from the customer 222. With the VPN established for each instance 204-208, the customer may tag (or otherwise include) an associated VLAN identifier with communication packets or frames intended for the particular instances of the cloud environment. By combining the VLAN tagged packets into a single stream of packets (or otherwise transmitting the VLAN tagged packets along the communication path 214-218 to the cloud environment 242), the customer 222 may transmit a stream of packets intended for the cloud instances 204-208 through the network 202 to the cloud environment 242 over a single communication connection 216. Further, the cloud environment 242 may then be configured to recognize or determine the VLAN tags included in headers of each of the received packets and, after associating the VLAN tags to a particular cloud instance 204-208, provide the packets to the intended cloud instance 204-208. In this manner, the network 202 facilitates the customer 222 multiplexing communications between the customer and multiple cloud instances 204-208 into a single stream of packets that can be transmitted on a route or path through the network. This may remove having individual Layer 2 private connections between the customer 222 and each instance 204-208 of the cloud environment 242.

Several advantages may be realized for the customer 222 and/or the network 202 through the use of VLAN separation in a connection between the customer to the network and a cloud environment 242 to allow the customer to access multiple instances 204-208 within the cloud through the connection. For example, a single route through the network 202 may be easier to manage for the customer 222 by an administrator of the network and for the customer itself by consolidating several secure routes or tunnels through the network 202 into a single route and applying global routing features to the route. Further, creating or setting up the routes between the customer 222 and the cloud environment 242 may occur faster (due to the fewer number of components to be configured) and, in some instances, may be created dynamically in response to a request by the customer. For example, the customer 222 may be provided with a mechanism to dynamically request a connection to the cloud environment 242 or a cloud instance 204 by providing the routing and connectivity information to a network device. The network device may then automatically configure the ports of the network 202 and the controllable aspects of the cloud environment 242 through calling one or more APIs 250 of the cloud to create the connection or route. Tearing down a route to the cloud environment 242 may also occur dynamically in a similar manner. In addition, fewer routes provided to the customer 222 by the network 202 may provide the network with more resources and devices to provide services to other customers. Thus, by utilizing VLAN tags to separate packets intended for multiple cloud instances 204-208, the network 202 may operate more efficiently and provide the customer 222 a better service in connecting to the cloud environment 242.

Figure 4:
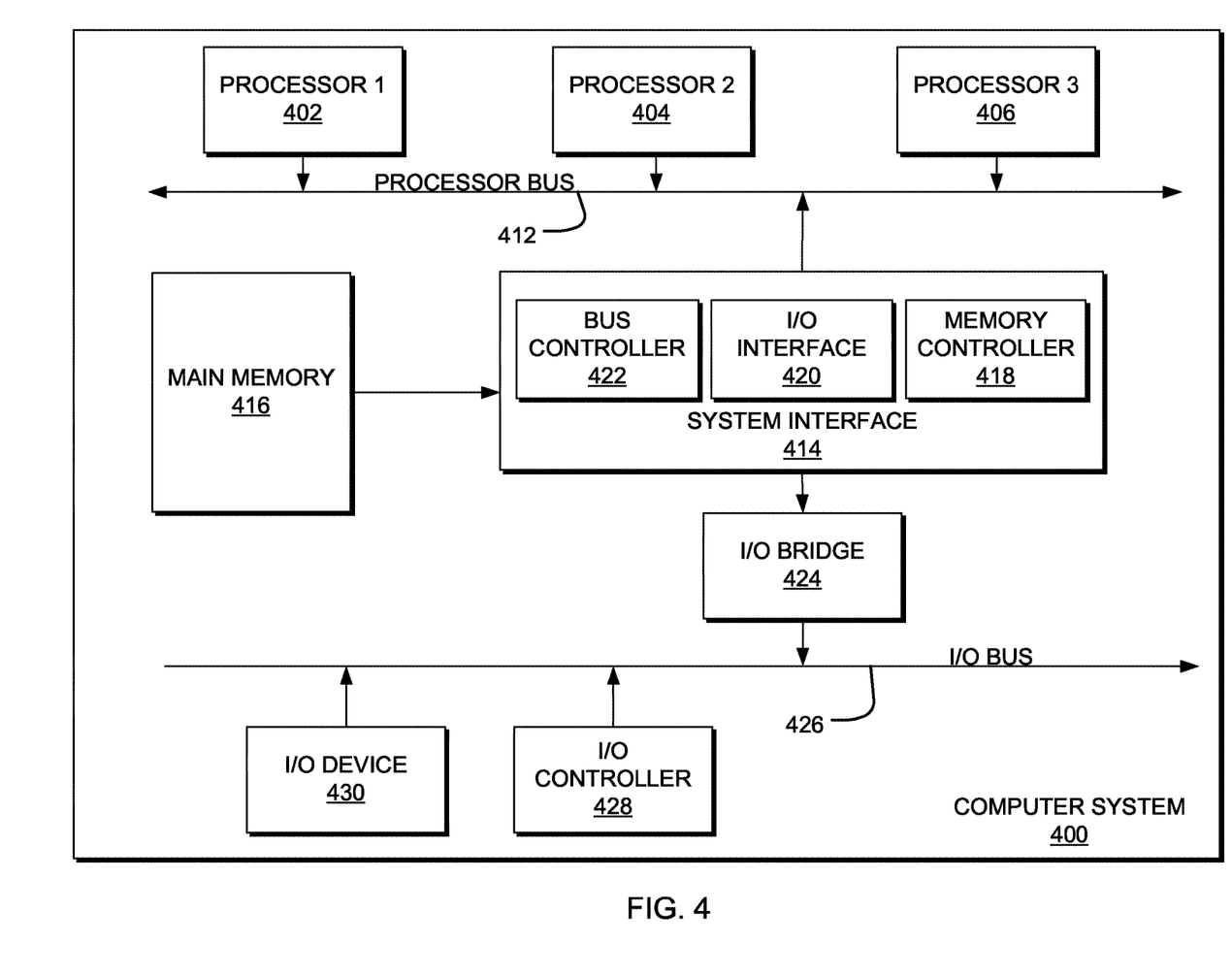
FIG. 4 is a diagram illustrating an example of a computing system which may be used in implementing embodiments of the present disclosure.

FIG. 4 is a block diagram illustrating an example of a computing device or computer system 400 which may be used in implementing the embodiments of the components of the network disclosed above. For example, the computing system 400 of FIG. 4 may be the monitoring device discussed above. The computer system (system) includes one or more processors 402-406. Processors 402-406 may include one or more internal levels of cache (not shown) and a bus controller or bus interface unit to direct interaction with the processor bus 412. Processor bus 412, also known as the host bus or the front side bus, may be used to couple the processors 402-406 with the system interface 414. System interface 414 may be connected to the processor bus 412 to interface other components of the system 400 with the processor bus 412. For example, system interface 414 may include a memory controller 418 for interfacing a main memory 416 with the processor bus 412. The main memory 416 typically includes one or more memory cards and a control circuit (not shown). System interface 414 may also include an input/output (I/O) interface 420 to interface one or more I/O bridges or I/O devices with the processor bus 412. One or more I/O controllers and/or I/O devices may be connected with the I/O bus 426, such as I/O controller 428 and I/O device 430, as illustrated. The system interface 414 may further include a bus controller 422 to interact with processor bus 412 and/or I/O bus 426.

I/O device 430 may also include an input device (not shown), such as an alphanumeric input device, including alphanumeric and other keys for communicating information and/or command selections to the processors 402-406. Another type of user input device includes cursor control, such as a mouse, a trackball, or cursor direction keys for communicating direction information and command selections to the processors 402-406 and for controlling cursor movement on the display device.

System 400 may include a dynamic storage device, referred to as main memory 416, or a random access memory (RAM) or other computer-readable devices coupled to the processor bus 412 for storing information and instructions to be executed by the processors 402-406. Main memory 416 also may be used for storing temporary variables or other intermediate information during execution of instructions by the processors 402-406. System 400 may include a read only memory (ROM) and/or other static storage device coupled to the processor bus 412 for storing static information and instructions for the processors 402-406. The system set forth in FIG. 4 is but one possible example of a computer system that may employ or be configured in accordance with aspects of the present disclosure.

According to one embodiment, the above techniques may be performed by computer system 400 in response to processor 404 executing one or more sequences of one or more instructions contained in main memory 416. These instructions may be read into main memory 416 from another machine-readable medium, such as a storage device. Execution of the sequences of instructions contained in main memory 416 may cause processors 402-406 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 416. Common forms of machine-readable medium may include, but is not limited to, magnetic storage medium; optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages should be understood by the foregoing description, and it should be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

I claim:

1. A method comprising:
receiving, at a first edge device, a first plurality of communication packets from a first device associated with a single port, the first plurality of communication packets associated with a first Virtual Local Area Network identifier, and receiving, from the single port, a second plurality of communication packets from the first device, the second plurality of communication packets associated with a second Virtual Local Area Network identifier, the first Virtual Local Area Network identifier associated with a first cloud computing instance in a cloud computing environment and the second Virtual Local Area Network identifier associated with a second cloud computing instance in the cloud computing environment;
establishing a connection between the first device and a second edge device of the cloud computing environment by receiving, from the single port at the first device, a UNI port identifier that is for the single port, the first Virtual Local Area Network identifier and the second Virtual Local Area Network identifier, and Layer 2 and Layer 3 transport information; and
routing, to the second edge device of the cloud computing environment, the first plurality of communication packets associated with the first Virtual Local Area Network identifier for connection to the first cloud computing instance and the second plurality of communication packets associated with the second Virtual Local Area Network identifier for connection to the second cloud computing instance.

2. The method of claim 1, wherein the first cloud computing instance and the second cloud computing instance comprise a first virtual private cloud and a second virtual private cloud, respectively, and wherein the first virtual private cloud and the second virtual private cloud are segmented environments within the cloud computing environment establishing a first virtual gateway and a second virtual gateway between the first device and the cloud computing environment based on the first Virtual Local Area Network identifier and the second Virtual Local Area Network identifier, respectively.

3. The method of claim 1, wherein the single port causes a transmission of all communication packets to all cloud computing instances on the cloud computing environment associated with the first device.

4. The method of claim 1, wherein the first Virtual Local Area Network identifier and the second Virtual Local Area Network identifier are provided in headers of the respective first plurality of communication packets and the second plurality of communication packets from the single port to establish a multiplexed connection between a network of the first device to a second network of the first edge device comprising at least the first cloud computing instance and the second cloud computing instance of the cloud computing environment.

5. The method of claim 1, the method further comprising:
establishing a communication path between multiple networks and the cloud computing environment by:
connecting one or more networks to the single port of the first device by a Link Aggregation Group connection to an egress port connected to the second edge device of the cloud computing environment in accordance with the communication path; and
wherein the single port receives or transmits packets from multiple networks that include the first Virtual Local Area Network identifier and the second Virtual Local Area Network identifier of packet streams from the first device.

6. An apparatus comprising:
an edge device including one or more processors and a communication interface coupled to the one or more processors, wherein the edge device provides communication between a cloud computing environment and a single port of a first device, and wherein the one or more processors are configured to perform operations comprising:
receiving, from the single port, a first plurality of communication packets from the first device, the first plurality of communication packets associated with a first Virtual Local Area Network identifier, and receiving, from the single port, a second plurality of communication packets from the first device, the second plurality of communication packets associated with a second Virtual Local Area Network identifier, the first Virtual Local Area Network identifier associated with a first cloud computing instance in a cloud computing environment and the second Virtual Local Area Network identifier associated with a second cloud computing instance in the cloud computing environment;
establishing a connection between the first device and a second edge device of the cloud computing environment by receiving, from the single port at the first device, a UNI port identifier that is for the single port, the first Virtual Local Area Network identifier and the second Virtual Local Area Network identifier, and Layer 2 and Layer 3 transport information; and
routing, to the second edge device of the cloud computing environment, the first plurality of communication packets associated with the first Virtual Local Area Network identifier for connection to the first cloud computing instance and the second plurality of communication packets associated with the second Virtual Local Area Network identifier for connection to the second cloud computing instance.

7. The apparatus of claim 6, wherein the first cloud computing instance and the second cloud computing instance comprise a first virtual private cloud and a second virtual private cloud, respectively, and wherein the first virtual private cloud and the second virtual private cloud are segmented environments within the cloud computing environment establishing a first virtual gateway and a second virtual gateway between the first device and the cloud computing environment based on the first Virtual Local Area Network identifier and the second Virtual Local Area Network identifier, respectively.

8. The apparatus of claim 6, wherein the single port causes a transmission of all communication packets to all cloud computing instances on the cloud computing environment associated with the first device.

9. The apparatus of claim 6, wherein the first Virtual Local Area Network identifier and the second Virtual Local Area Network identifier are provided in headers of the respective first plurality of communication packets and the second plurality of communication packets from the single port to establish a multiplexed connection between a network of the first device to a second network of the first edge device comprising at least the first cloud computing instance and the second cloud computing instance of the cloud computing environment.

10. The apparatus of claim 6, the one or more processors further configured to perform operations comprising:
establishing a communication path between multiple networks and the cloud computing environment by:
connecting one or more networks to the single port of the first device by a Link Aggregation Group connection to an egress port connected to a provider edge of the cloud computing environment in accordance with the communication path; and
wherein the single port receives or transmits packets from multiple networks that include the first Virtual Local Area Network identifier and the second Virtual Local Area Network identifier of packet streams from the first device.

11. A non-transitory computer-readable medium comprising instructions stored thereon, the instructions executable by one or more processors of a computing system to perform a method for dynamically requesting a network resource, the instructions causing the computing system to:
receive, from a single port, a first plurality of communication packets from a first device, the first plurality of communication packets associated with a first Virtual Local Area Network identifier, and receive, from the single port, a second plurality of communication packets from the first device, the second plurality of communication packets associated with a second Virtual Local Area Network identifier, the first Virtual Local Area Network identifier associated with a first cloud computing instance in a cloud computing environment and the second Virtual Local Area Network identifier associated with a second cloud computing instance in the cloud computing environment;
establish a connection between the first device and the first edge device of the cloud computing environment by receiving, from the single port at the first device, a UNI port identifier that is for the single port, the first Virtual Local Area Network identifier and the second Virtual Local Area Network identifier, and Layer 2 and Layer 3 transport information; and
route, to the first edge device of the cloud computing environment, the first plurality of communication packets associated with the first Virtual Local Area Network identifier for connection to the first cloud computing instance and the second plurality of communication packets associated with the second Virtual Local Area Network identifier for connection to the second cloud computing instance.

12. The non-transitory computer-readable medium of claim 11, wherein the first cloud computing instance and the second cloud computing instance comprise a first virtual private cloud and a second virtual private cloud, respectively, and wherein the first virtual private cloud and the second virtual private cloud are segmented environments within the cloud computing environment establishing a first virtual gateway and a second virtual gateway between the first device and the cloud computing environment based on the first Virtual Local Area Network identifier and the second Virtual Local Area Network identifier, respectively.

13. The non-transitory computer-readable medium of claim 11, wherein the single port causes a transmission of all communication packets to all cloud computing instances on the cloud computing environment associated with the first device.

14. The non-transitory computer-readable medium of claim 11, the instructions causing the computing system to further:
establish a communication path between multiple networks and the cloud computing environment by:
connecting one or more networks to the single port of the first device by a Link Aggregation Group connection to an egress port connected to a provider edge of the cloud computing environment in accordance with the communication path; and
wherein the single port receives or transmits packets from multiple networks that include the first Virtual Local Area Network identifier and the second Virtual Local Area Network identifier of packet streams from the first device.

* * * * *